July 22, 1969     M. E. TINDALL     3,457,397
SAFETY LIGHT
Filed May 20, 1966
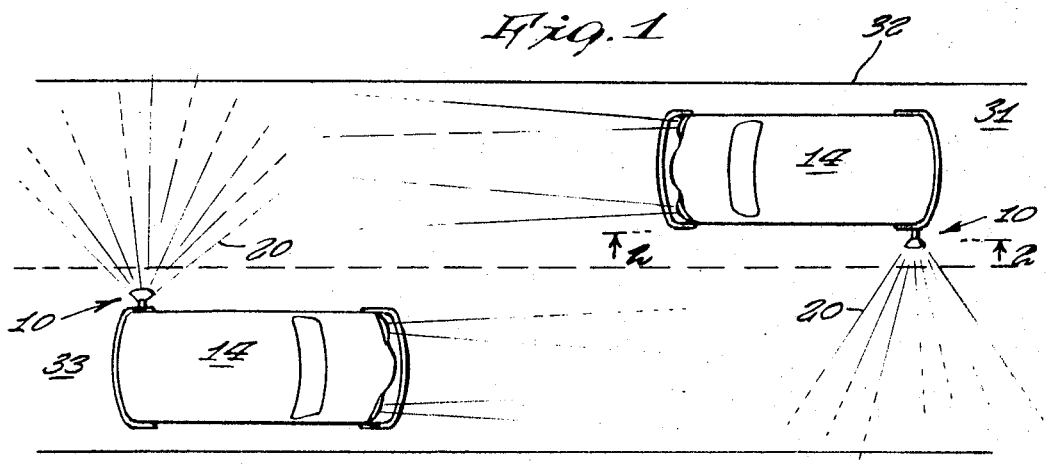
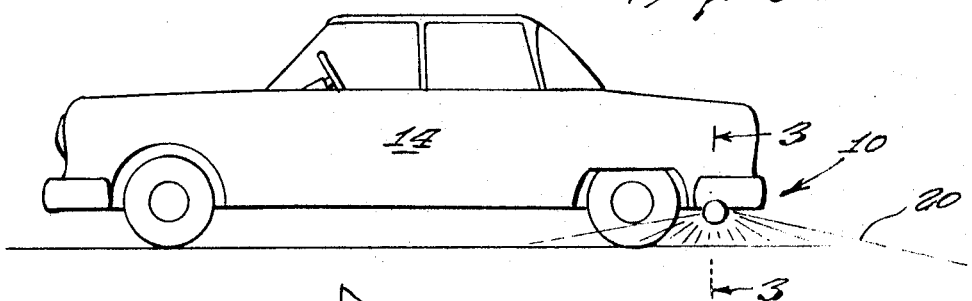
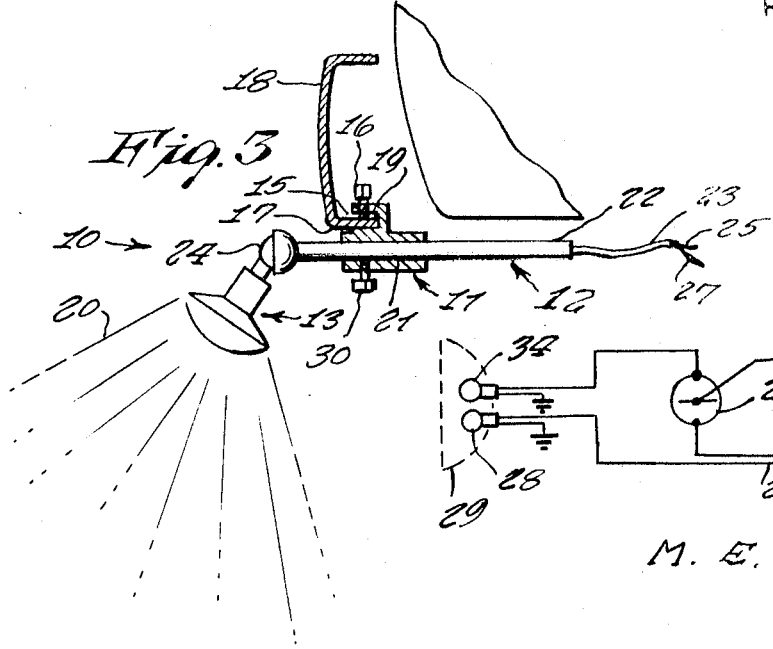
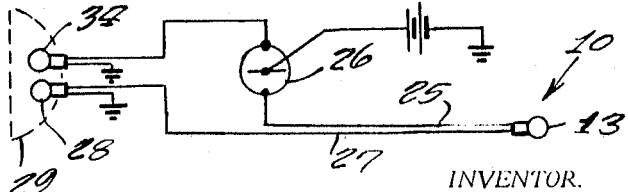
INVENTOR.
M. E. TINDALL

United States Patent Office 3,457,397
Patented July 22, 1969

3,457,397
SAFETY LIGHT
Marion E. Tindall, North Carrollton, Miss. 38947
Filed May 20, 1966, Ser. No. 551,629
Int. Cl. B60q 1/32
U.S. Cl. 240—8.2           2 Claims

ABSTRACT OF THE DISCLOSURE

An auxiliary safety lamp mounted on the rear bumper of a vehicle having a mounting bracket holding a rod connected to a universally adjustable lamp. The lamp is electrically connected in series with the low beam of the front headlights by the operation of the vehicle dimmer switch.

---

This invention relates generally to automobile lights. More specifically it relates to an automobile side light.

It is generally well known to most drivers that upon asphalt surfaced highways during a rain, the mirror-like surface reflects various lights and can make driving very hazardous. Especially with siderode highway reflecters in mountainous country with sharp curving roads, the combination of approaching autolights together with the safety reflecters presents an illusion and an uncertainty, making the passing of cars not only exceedingly difficult but also dangerous.

Accordingly, it is a principal object of the present invention to provide a side passing auto safety light which will illuminate the adjacent lane of the highway for a vehicle approaching in the opposite direction so that the driver may safely pass.

Another object of the present invention is to provide a side passing auto safety light which is sidewardly adjustable, relative to the vehicle and which is retractable when not in use.

Still another object of the present invention is to provide a side passing auto safety light having self-contained means for universal adjustment in all directions for attaining a maximum efficiency in use.

Still another object of the present invention is to provide a side passing auto safety light which is automatically turned on when the dimmer switch transfers electrical power from the headlight bright lamp to the headlight lowbeam lamp.

Other objects of the present invention are to provide a side passing auto safety light which is simple in design, inexpensive to manufacture, rugged in construction, easy to use and efficient in operation.

These and other objects will be readily evident upon a study of the following specification and accompanying drawing wherein:

FIGURE 1 is a plan view of a highway showing two vehicles approaching each other and each vehicle incorporating the present invention shown in operative use, FIGURE 2 is a side elevation view of one of the vehicles taken on the line 22 of FIGURE 1, FIGURE 3 is an enlarged cross-sectional view taken on the line 33 of FIGURE 2, and FIGURE 4 is an electrical circuit of the present invention.

Referring now to the drawing in detail, the numeral 10 represents a side passing auto safety light according to the present invention wherein there is a bracket 11, a sliding bar 12 and a lamp 13.

The present safety light 10 is secured to an automotive vehicle 14 so that the lamp 13 directs rays in a direction which is sidewardly relative to the vehicle.

The bracket 11 comprises a singular member having a jaw 15 and a set screw 16 mounted in the jaw for bearing against a flange 17 of an automobile rear bumper 18 that is placed within the mouth 19 of the bracket. Thus the present safety light is readily adaptable for being secured to any make of vehicle and at varied position upon the bumper so to make possible the safety light to direct light rays 20 into a sidewardly direction relative to the vehicle.

An opening 21 is provided in the bracket 11 for slideably receiving therein a rod 22 through which electrical wiring 23 extends to the lamp 13. At one end of the rod 22 there is a universal joint 24, the universal joint comprising a ball and socket joint to permit the lamp to be fully adjustable in all directions.

One of the wires 25 of the lamp 13 is connected to a dimmer switch 26 and the other wire 27 is connected to a lowbeam lamp 28 within the headlight 29, of the vehicle 14. It will thus be noted that the dimmer switch will activate the lamp 13 at the same time that it activates the lowbeam lamp 28.

In operative use the motorist loosens a set screw 30 and slides the rod 22 from a retracted position outwardly to an operational position, after which he again tightens the set screw 30 to lock the rod in operating position. The lamp 13 is swiveled about the universal joint to a preferred position so that the light rays 20 therefrom will be directed into the path of a passing vehicle in an adjacent lane of a highway. Accordingly when the vehicle 14 is moving in a lane 31 of a highway 32 and another vehicle approaches the same from an opposite direction in a lane 33, the dimmer switch 26 is either manually or automatically activated to shut off electrical power to the bright lamps 34 in the headlights and causing electrical power to be delivered to the lamp 13 and the lowbeam lamp 28. Thus as the vehicles approach each other, the light rays 20 illuminate a portion of the lane adjacent to the vehicle so that the passing vehicle can readily recognize the road ahead and thereby prevent colliding with the vehicle or with an object upon the side of the road.

While various changes may be made in the detailed construction, it is understood that such changes will be within the spirit and scope of the present invention as is defined by the appended claims.

I claim:

1. In a side passing automobile safety light, the combination of a bracket, means for supporting said bracket over a rear bumper of an automotive vehicle, a rod slidably supported within said bracket, electric wiring extending through said rod, a universal joint at one end of said rod, said universal joint supporting said lamp, said bracket comprising a singular member having a jaw on one side, said jaw forming one side of a mouth, a set screw fitted within said jaw bearing against a flange of said automotive bumper which is fitted into said mouth, said bracket having an opening therethrough for slidably retaining said slidable rod therein, and a threaded second set screw threadedly mounted upon said bracket for securing said rod in selected position in said bracket.

2. The combination as set forth in claim 1 wherein one electrical wire of said safety lamp is connected to one end of a dimmer switch of said automotive vehicle and the other electrical wire of said safety light lamp is connected to the lowbeam lamp in the headlight of said automotive vehicle.

References Cited
UNITED STATES PATENTS
| | | | |
|---|---|---|---|
| 1,401,153 | 12/1921 | Halliwell | 240—8.2 |
| 1,497,760 | 6/1924 | Lyon | 240—8.2 |
| 2,442,580 | 6/1948 | Barlow. | |
| 2,503,974 | 4/1950 | Sparaco | 240—8.2 XR |
| 2,796,515 | 6/1957 | Waskie | 240—7.1 |

FOREIGN PATENTS
932,831  7/1956  Germany.

NORTON ANSHER, Primary Examiner

LEO H. McCORMICK, JR., Assistant Examiner

U.S. Cl. X.R.

340—89